United States Patent
Nishioka et al.

(10) Patent No.: US 8,276,369 B2
(45) Date of Patent: Oct. 2, 2012

(54) EXHAUST PURIFICATION SYSTEM OF INTERNAL COMBUSTION ENGINE

(75) Inventors: Hiromasa Nishioka, Susono (JP); Shinya Hirota, Susono (JP); Kotaro Hayashi, Mishima (JP); Takamitsu Asanuma, Mishima (JP); Kohei Yoshida, Gotenba (JP); Hiroshi Otsuki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 448 days.

(21) Appl. No.: 12/599,212

(22) PCT Filed: Jul. 11, 2008

(86) PCT No.: PCT/JP2008/062970
§ 371 (c)(1),
(2), (4) Date: Nov. 6, 2009

(87) PCT Pub. No.: WO2009/016973
PCT Pub. Date: Feb. 5, 2009

(65) Prior Publication Data
US 2010/0257847 A1    Oct. 14, 2010

(30) Foreign Application Priority Data
Jul. 27, 2007 (JP) ................................. 2007-196343

(51) Int. Cl.
*F01N 3/00* (2006.01)
*F01N 3/10* (2006.01)
*F01N 3/02* (2006.01)

(52) U.S. Cl. ................ 60/286; 60/285; 60/295; 60/301; 60/303; 60/311

(58) Field of Classification Search .................... 60/285, 60/286, 295, 297, 301, 303, 311
See application file for complete search history.

(56) References Cited

U.S. PATENT DOCUMENTS
6,758,036 B1 * 7/2004 Molinier .......................... 60/286
(Continued)

FOREIGN PATENT DOCUMENTS
EP    1 321 643 A1    6/2003
JP    2004 92524    3/2004
JP    2006 291825    10/2006
(Continued)

OTHER PUBLICATIONS
Extended European Search Report issued Oct. 4, 2010 in Patent Application No. 08778262.9.

*Primary Examiner* — Thomas Denion
*Assistant Examiner* — Audrey K Bradley
(74) *Attorney, Agent, or Firm* — Oblon, Spivak, McClelland, Maier & Neustadt, L.L.P.

(57) ABSTRACT

In the present exhaust purification system of an internal combustion engine, a particulate filter is arranged downstream of an NOx storage/reduction catalyst device and an S trap device is arranged upstream of the NOx storage/reduction catalyst device. A first fuel supplying device for supplying additional fuel for regeneration of the particulate filter to the exhaust system upstream of the S trap device or into the cylinder is provided. An amount of the additional fuel supplied by the first fuel supplying device is controlled to make the S trap device not release SOx. A second fuel supplying device is provided in the exhaust system between the NOx storage/reduction catalyst device and the particulate filter to make up for a deficiency of the additional fuel supplied by the first fuel supplying device in the regeneration treatment of the particulate filter.

4 Claims, 3 Drawing Sheets

U.S. PATENT DOCUMENTS

| | | | |
|---|---|---|---|
| 6,820,414 B2 * | 11/2004 | Stroia et al. | 60/286 |
| 7,171,801 B2 * | 2/2007 | Verkiel et al. | 60/297 |
| 2002/0033017 A1 * | 3/2002 | Bruggemann et al. | 60/295 |
| 2004/0040291 A1 | 3/2004 | Toshioka et al. | |
| 2005/0178110 A1 * | 8/2005 | Mital et al. | 60/286 |
| 2007/0245723 A1 * | 10/2007 | Kamoshita et al. | 60/299 |

FOREIGN PATENT DOCUMENTS

| | | |
|---|---|---|
| JP | 2006-291866 | 10/2006 |
| JP | 2007 64183 | 3/2007 |
| JP | 2007 146784 | 6/2007 |
| JP | 2007 154764 | 6/2007 |
| WO | WO 2005/040571 A1 | 5/2005 |

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

In an exhaust system of an internal combustion engine which performs lean combustion like a diesel engine, a NOx storage/reduction catalyst device is arranged. The NOx storage/reduction catalyst device satisfactorily stores NOx when the air-fuel ratio of the exhaust gas is lean, namely when the concentration of oxygen in the exhaust gas is high. On the other hand, as a regeneration treatment, when the air-fuel ratio of the exhaust gas is made a stoichiometric air-fuel ratio or a rich air-fuel ratio, namely, the concentration of oxygen is decreased, the NOx storage/reduction catalyst device releases the stored NOx and purifies to reduce the released NOx by reducing materials in the exhaust gas.

The exhaust gas of the internal combustion engine also includes particulates. It is desired to trap the particulates and reduce the amount of particulate emitted to the atmosphere. Accordingly, it is suggested that a particulate filter for this purpose is arranged downstream of the NOx storage/reduction catalyst device.

The particulate filter requires a regeneration treatment to burn off the trapped particulate before the trapped particulate causes a large exhaust resistance. As the regeneration treatment, it is suggested that additional fuel be supplied to the exhaust gas, a part of the additional fuel is burned in the NOx storage/reduction catalyst device to increase the temperature of the exhaust gas, the relatively high temperature exhaust gas and the remaining additional fuel flow into the particulate filter, the remaining additional fuel is burned in the particulate filter the temperature of which is increased by the relatively high temperature exhaust gas, and thus the temperature of the particulate filter is further increased to burn off the trapped particulate (for example, refer to Japanese Unexamined Patent Publication No. 2006-291825).

DISCLOSURE OF THE INVENTION

The NOx storage/reduction catalyst device also stores SOx in the exhaust gas by a similar mechanism as with the NOx. Because, SOx is stored as a stable sulfate, it is difficult to release SOx. Therefore, an amount of SOx stored in the NOx storage/reduction catalyst device goes on increasing and finally the NOx storage/reduction catalyst device comes to insufficiently store NOx. To release SOx, the temperature of the NOx storage/reduction catalyst device must be increased to a high temperature like 700 degrees C. Therefore, the NOx storage/reduction catalyst device deteriorates by heat.

To prevent heat deterioration of the NOx storage/reduction catalyst device, SOx should not be stored in the NOx storage/reduction catalyst device. Accordingly, an S trap device for storing SOx similarly with the NOx storage/reduction catalyst device may be arranged upstream of the NOx storage/reduction catalyst device.

In such a construction, when the additional fuel is supplied upstream of the S trap device in the regeneration treatment of the particulate filter, SOx may be released from the S trap device and the released SOx may be stored in the NOx storage/reduction catalyst device.

Accordingly, an object of the present invention is to provide an exhaust purification system of an internal combustion engine in which a particulate filter is arranged downstream of an NOx storage/reduction catalyst device and an S trap device is arranged upstream of the NOx storage/reduction catalyst device, which can prevent SOx from being released from the S trap device when a part of the additional fuel supplied to the exhaust system upstream of the S trap device or into the cylinder gas is burned in the NOx storage/reduction catalyst device to increase the temperature of the exhaust gas flowing into the particulate filter and a good regeneration treatment of the particulate filter is carried out.

An exhaust purification system of an internal combustion engine as set forth in claim 1 of the present invention in which a particulate filter is arranged downstream of an NOx storage/reduction catalyst device and an S trap device is arranged upstream of the NOx storage/reduction catalyst device, characterized in that a first fuel supplying means for supplying additional fuel for a regeneration treatment of the particulate filter to the exhaust system upstream of the S trap device or into the cylinder is provided, an amount of the additional fuel supplied by the first fuel supplying means is controlled to make the S trap device not release SOx, and a second fuel supplying means is provided in the exhaust system between the NOx storage/reduction catalyst device and the particulate filter to make up for a deficiency of the additional fuel supplied by the first fuel supplying means in the regeneration treatment of the particulate filter.

An exhaust purification system of an internal combustion engine as set forth in claim 2 of the present invention provides the exhaust purification system of the internal combustion engine as set forth in claim 1 characterized in that the second fuel supplying means stops to supply the additional fuel in engine deceleration.

An exhaust purification system of an internal combustion engine as set forth in claim 3 of the present invention provides the exhaust purification system of the internal combustion engine as set forth in claim 1 characterized in that the S trap device is not intended to release SOx and is exchanged if necessary.

According to the exhaust purification system of the internal combustion engine as set forth in claim 1 of the present invention, the additional fuel for the regeneration treatment of the particulate filter is supplied to the exhaust system upstream of the S trap device or into the cylinder by the first fuel supplying means. An amount of the additional fuel supplied by the first fuel supplying means is controlled to make the S trap device not release SOx and thus the S trap device is prevented from releasing SOx. A part of the additional fuel supplied by the first fuel supplying means is burned in the NOx storage/reduction catalyst device to increase the temperature of the exhaust gas flowing into the particulate filter, and therefore the remaining additional fuel can be burned in the particulate filter to further increase the temperature of the particulate filter. However, the amount of the additional fuel supplied by the first fuel supplying means cannot sufficiently increase the temperature of the particulate filter and is in short supply for the regeneration treatment of the particulate filter. Accordingly, the second fuel supplying means is provided in the exhaust system between the NOx storage/reduction catalyst device and the particulate filter, and the second fuel supplying means can make up for a deficiency of the additional fuel supplied by the first fuel supplying means. Thus, the temperature of the particulate filter can be increased at the desired temperature to realize good regeneration treatment of the particulate filter.

According to the exhaust purification system of the internal combustion engine as set forth in claim 2 of the present invention, in the exhaust purification system of the internal combustion engine as set forth in claim 1, because in engine deceleration, the temperature of the exhaust gas is low and the temperature of the S trap device is also low, even if an air-fuel ratio of the exhaust gas is made a rich air-fuel ratio of a relatively small value by the additional fuel supplied by the first fuel supplying means, SOx is not released from the S trap device. Further, because the amount of the exhaust gas is small in engine deceleration, the air-fuel ratio of the exhaust gas can be made the desired rich air-fuel ratio by a relatively small amount of additional fuel. Thus, in engine deceleration, a regeneration treatment of the NOx storage/reduction catalyst device can be easily carried out. The temperature of the exhaust gas is increased by this regeneration treatment of the NOx storage/reduction catalyst device, the exhaust gas with the remaining additional fuel flows into the particulate filter, and the remaining additional fuel is burned to increase the temperature of the particulate filter. Therefore, the regeneration treatment of the particulate filter is also carried out. In such engine deceleration, because an amount of the exhaust gas is small, an amount of heat flowing out from the particulate filter is small. Therefore, if the additional fuel is supplied by the second fuel supplying means, the particulate filter may melt by excessive temperature rise. Accordingly, the second fuel supplying means stops to supply the additional fuel in engine deceleration.

According to the exhaust purification system of the internal combustion engine as set forth in claim 3 of the present invention, in the exhaust purification system of the internal combustion engine as set forth in claim 1, the S trap device is not intended to release SOx and is exchanged if necessary. Therefore, the present exhaust purification system does not need a complicated mechanism in the exhaust system to restrain the NOx storage/reduction catalyst device from storing the SOx released from the S trap device.

BEST MODE FOR CARRYING OUT THE INVENTION

Figure 1:
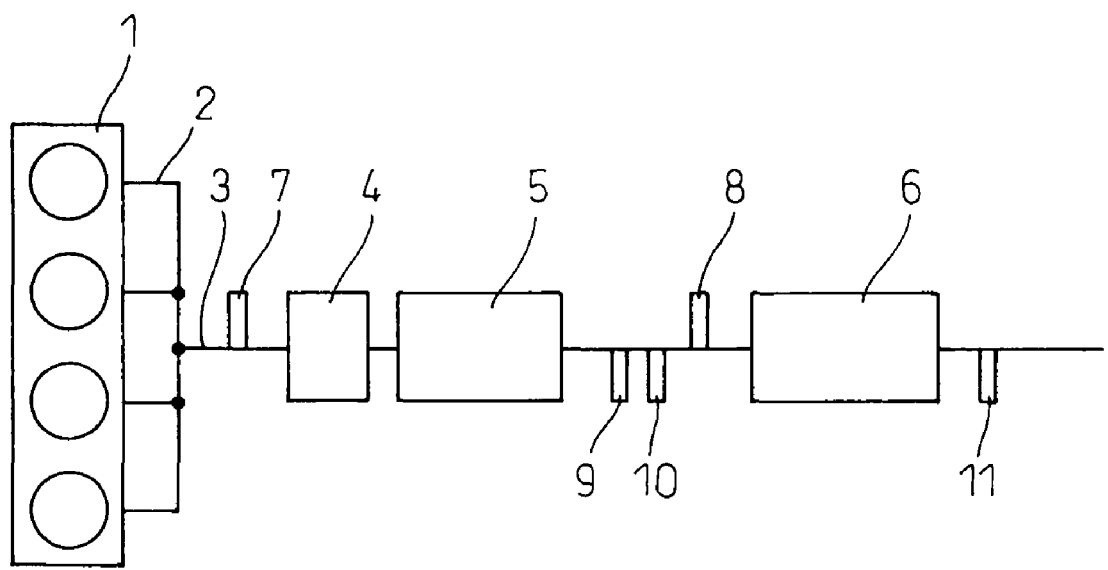
FIG. 1 is a schematic view of an exhaust purification system of an internal combustion engine according to the present invention.

FIG. 1 is a schematic view showing an embodiment of an exhaust purification system of an internal combustion engine according to the present invention. In FIG. 1, reference numeral 1 is an engine body performing lean combustion such as a diesel engine. Reference numeral 2 is an exhaust manifold. Reference numeral 3 is an exhaust passage downstream of the exhaust manifold 2. In the exhaust passage 3, an S trap device 4, an NOx storage/reduction catalyst device 5 downstream of the S trap device 4, and a particulate filter 6 downstream of the NOx storage/reduction catalyst device 5 are arranged.

In such an arrangement, SOx in the exhaust gas is stored in the S trap device 4 upstream of the NOx storage/reduction catalyst device and is not almost stored in the NOx storage/reduction catalyst device 5. Therefore, the NOx storage/reduction catalyst device 5 is not required to release SOx with heat deterioration. The S trap device 4 is exchanged with a new one (or one which is able to store SOx) when it stores a large amount of SOx.

Particulates in the exhaust gas are trapped in the particulate filter 6. The particulate filter 6 carries a noble metal catalyst such that fuel in the exhaust gas is burned by the noble metal catalyst to increase the temperature of the particulate filter 6 to the particulate burning temperature for a regeneration treatment to burn off the trapped particulates.

The particulate filter 6 is positioned far from the engine body, for example, under the floor of the vehicle. Therefore, the noble metal catalyst on the particulate filter is relative low temperature and if the additional fuel is merely supplied, the noble metal catalyst cannot burn the additional fuel well. Accordingly, it is required that a first fuel supplying device 7 is arranged in the exhaust passage 3 downstream of the exhaust manifold 2 and upstream of the S trap device 4, a part of the additional fuel supplied by the first fuel supplying device 7 is burned in the NOx storage/reduction catalyst device 5 to increase the temperature of the exhaust gas, the remaining additional fuel with the exhaust gas having the increased temperature flows into the particulate filter 6, and the remaining additional fuel is burned well in the particulate filter 6 to increase the temperature of the particulate filter to the particulate regeneration temperature.

Figure 2:
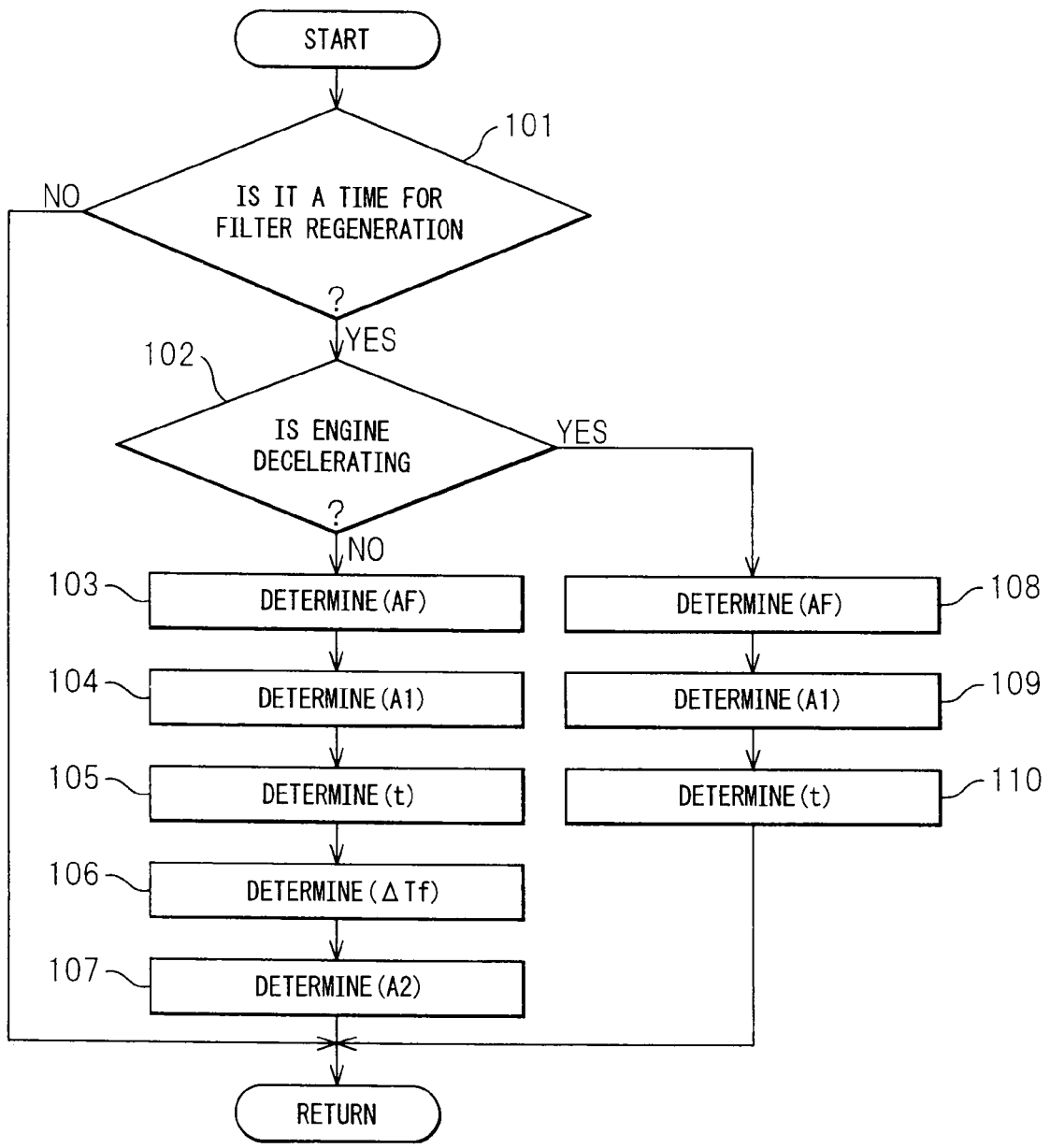
FIG. 2 is a flow chart for the regeneration treatment of the particulate filter.

In the present embodiment, the regeneration treatment of the particulate filter 6 is carried out according to the flow chart shown in FIG. 2. First, at step 101, it is determined if the regeneration treatment of the particulate filter 6 is required. The regeneration treatment may be required periodically, for example, every a predetermined running distance or every a predetermined running period. On the other hand, an amount of particulate exhausted in each engine operation is integrated and the regeneration treatment may be required when the integrated amount of particulate reaches a predetermined value.

Figure 3:
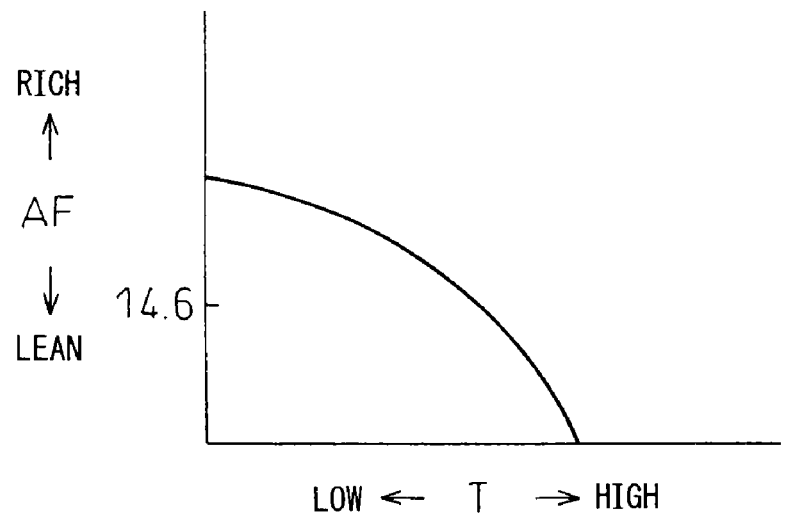
FIG. 3 is a map for determining an air-fuel ratio of the exhaust gas in the flow chart of FIG. 2.

When the result at step 101 is negative, the routine is finished. However, when the result at step 101 is positive, it is determined if the engine is decelerating at step 102. When the engine is not decelerating, an air-fuel ratio (AF) of the exhaust gas flowing into the S trap device 4 is determined at step 103. FIG. 3 is a map showing a relationship between the temperature of the S trap device 4 and an air-fuel ratio (AF) of the exhaust gas making the S trap device release SOx. The higher the temperature of the S trap device 4 is, the leaner (or the larger) air-fuel ratio makes the S trap device release SOx. Accordingly, on the basis of FIG. 3, the smallest air-fuel ratio (the rich air-fuel ratio) making the S trap device not release SOx at the current estimated temperature of the S trap device 4 is determined.

Figure 4:
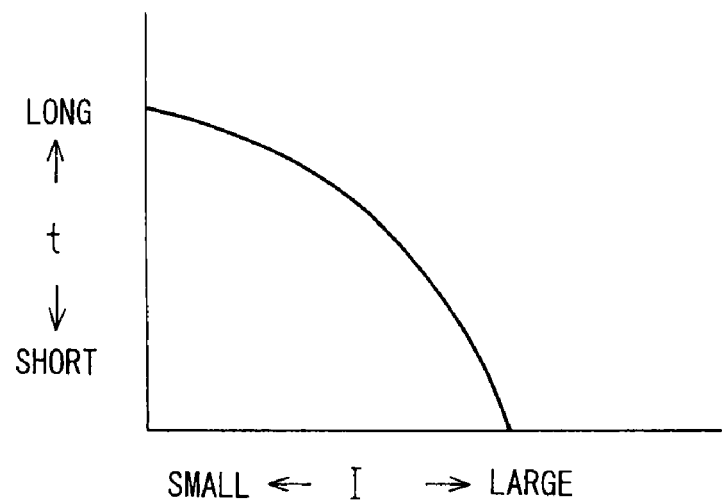
FIG. 4 is a map for determining a period for supplying the additional fuel in the flow chart of FIG. 2.

Next, at step 104, an amount of the additional fuel (A1) supplied by the first fuel supplying device 7 per unit time required to realize the smallest air-fuel ratio (AF) is determined. When the air-fuel ratio of the exhaust gas is made the smallest air-fuel ratio (AF), the larger an amount of SOx stored in the S trap device 4 is or the smaller the smallest air-fuel ratio (AF) is, the earlier it starts to release SOx from the S trap device. Accordingly, at step 105, on the basis of FIG. 4, the longest period (t) for supplying the additional fuel making the S trap device not release SOx at the current amount of SOx (I) stored in the S trap device 4 is determined. The map shown in FIG. 4 is set in each air-fuel ratio (AF).

Thus, the first fuel supplying device 7 supplies the amount of the additional fuel (A1) per unit time for the longest period (t). Therefore, SOx is not released from the S trap device 4. An air-fuel ratio sensor 9 is arranged in the exhaust passage between the NOx storage/reduction catalyst device 5 and the particulate filter 6 and by using of the air-fuel ratio sensor, it can be confirmed if the smallest air-fuel ratio (AF) is realized. On the other hand, by using of the air-fuel ratio sensor 9, the amount of the additional fuel supplied by the first fuel supplying device 7 can be feed-back controlled such that the smallest air-fuel ratio (AF) is realized.

Further, an upstream side temperature sensor 10 is also arranged in the exhaust passage between the NOx storage/reduction catalyst device 5 and the particulate filter 6 and the upstream side temperature sensor 10 can detect the temperature (Tg1) of the exhaust gas flowing into the particulate filter 6. Next, at step 106, a difference (ΔTf) between the regeneration temperature (Tf) (particulate burning temperature) of the particulate filter 6 and the temperature (Tg1) of the exhaust gas flowing into the particulate filter is calculated.

The temperature (Tg1) of the exhaust gas detected by the upstream side temperature sensor 10 does not reach the regeneration temperature (Tf) of the particulate filter 6 because the amount of the additional fuel (A1) supplied by the first fuel supplying device is relative small to make the S trap device 4 not release SOx. To supply the deficiency of the additional fuel supplied by the first fuel supplying device, a second fuel supplying device 8 is arranged in the exhaust passage between the NOx storage/reduction catalyst device 5 and the particulate filter 6.

The temperature (Tg1) of the exhaust gas detected by the upstream side temperature sensor 10 results from the temperature rise of the exhaust gas with burning of a part of the amount of the additional fuel (A1) supplied by the first fuel supplying device 7 in the NOx storage/reduction catalyst device 5. Therefore, an amount of the remaining additional fuel which does not burn in the NOx storage/reduction catalyst device 5 in the amount of the additional fuel (A1) and which flows into the particulate filter 6 can be estimated.

At step 107, an amount of the additional fuel (A2) per unit time supplied by the second fuel supplying device 8 in addition to the amount of the remaining the additional fuel is determined. Therefore, the remaining of the amount of the additional fuel (A1) and the amount of the additional fuel (A2) burn in the particulate filter 6 to increase the temperature of the particulate filter 6 to the regeneration temperature (Tf).

The amount of the exhaust gas per unit time is taken into consideration. The larger the amount of the exhaust gas per unit time is, the larger an amount of heat flowing out from the particulate filter 6 with the exhaust gas is and therefore the larger the amount of the additional fuel (A2) per unit time must be set to maintain the regeneration temperature (Tf) of the particulate filter 6. A downstream side temperature sensor 11 is arranged downstream of the particulate filter 6 and by using of the downstream side temperature sensor, it can be confirmed if the temperature (Tg2) of the exhaust gas flowing out form the particulate filter 6 is the regeneration temperature (Tf). On the other hand, by using of the downstream side temperature sensor, the amount of the additional fuel (A2) supplied by the second fuel supplying device 8 can be feed-back controlled such that the temperature (Tg2) of the exhaust gas flowing out form the particulate filter 6 is the regeneration temperature (Tf).

In engine deceleration, the temperature of the exhaust gas is low and thus the temperature of the S trap device is also low. Therefore, even if the air-fuel ratio of the exhaust gas is made a rich air-fuel ratio of relative small value, SOx is not released from the S trap device. On the other hand, an amount of the exhaust gas is small and thus the air-fuel ratio of the exhaust gas can be made the desired rich air-fuel ratio by a relative small amount of the additional fuel.

The NOx storage/reduction catalyst device 5 cannot store NOx without limit and thus the NOx storage/reduction catalyst device needs a regeneration treatment in which NOx is released and the released NOx is reduced to be purified before it come to be impossible to store NOx (saturation). The regeneration treatment makes the exhaust gas of a rich air-fuel ratio flow into the NOx storage/reduction catalyst device 5. In engine deceleration, the present embodiment carries out the regeneration treatment of the NOx storage/reduction catalyst device simultaneously with the regeneration treatment of the particulate filter.

Namely, when the engine is decelerating and the result at step 102 is positive, at step 108, the smallest air-fuel ratio (the rich air-fuel ratio) making the S trap device not release SOx at the current temperature of the S trap device 4 is determined on the basis of FIG. 3.

Next, at step 109, the amount of the additional fuel (A1) supplied by the first fuel supplying device 7 per unit time required to realize the smallest air-fuel ratio (AF) is determined. Further, at step 110, on the basis of FIG. 4, the longest period (t) for supplying the additional fuel making the S trap device not release SOx at the current amount of SOx (I) stored in the S trap device 4 is determined.

Thus, the first fuel supplying device 7 supplies the amount of the additional fuel (A1) per unit time for the longest period (t). Therefore, SOx is not released from the S trap device 4. The high temperature exhaust gas in the regeneration treatment of the NOx storage/reduction catalyst device 5 with the remaining the additional fuel flows into the particulate filter 6 to sufficiently increase the temperature of the particulate filter 6.

The current amount of the exhaust gas per unit time is very small because the engine is decelerating and the exhaust gas does not almost take away heat from the particulate filter 6. Therefore, the regeneration treatment of the particulate filter 6 can be also carried out by using of the exhaust gas in the regeneration treatment of the NOx storage/reduction catalyst device 5. If the second fuel supplying device 8 supplies the additional fuel, the particulate filter 6 may melt by excessive temperature rise. Accordingly, the second fuel supplying device 8 stops to supply the additional fuel in engine deceleration.

The first fuel supplying device 7 may be a fuel injector for injecting fuel directly into the cylinder to inject the additional fuel in an expansion stroke or an exhaust stroke. In the present embodiment, the S trap device 4 does not release SOx in the regeneration treatment of the particulate filter 6. Therefore, the period for supplying the additional fuel is too short and the regeneration treatment of the particulate filter may be finished. On the other hand, when the regeneration treatment of the particulate filter is merely carried out simultaneously with the regeneration treatment of the NOx storage/reduction catalyst device, the regeneration treatment of the particulate filter may be finished. However, because a part of the trapped particulates can be burned, the time for regenerating the particulate filter 6 can be cancelled.

List of Reference Numerals

1: engine body
3: exhaust passage
4: S trap device
5: NOx storage/reduction catalyst device
7: first fuel supply device
8: second fuel supplying device

The invention claimed is:

1. An exhaust purification system of an internal combustion engine comprising:

an NOx storage/reduction catalyst device;

a particulate filter arranged downstream of said NOx storage reduction catalyst device; and a sulfur trap device is arranged upstream of said NOx storage/reduction catalyst device, wherein a first fuel supplying device which supplies additional fuel for a regeneration treatment of said particulate filter to the exhaust system upstream of said sulfur trap device or into a cylinder is provided, a first amount of said additional fuel supplied by said first fuel supplying device is controlled to make said sulfur trap device not release SOx, and a second fuel supplying device, provided in the exhaust system between said NOx storage/reduction catalyst device and said particulate filter, which supplies a second amount of additional fuel to said first amount of said additional fuel supplied by said first fuel supplying device in the regeneration treatment of said particulate filter if said first amount of said additional fuel is insufficient for the regeneration treatment of said particulate filter.

2. An exhaust purification system of an internal combustion engine according to claim 1, wherein said second fuel supplying device does not supply said second amount of additional fuel in engine deceleration.

3. An exhaust purification system of an internal combustion engine according to claim 1, wherein said particulate filter includes a noble metal catalyst such that fuel in exhaust gas is burned by the noble metal catalyst to increase a temperature of said particulate filter to a particulate burning temperature for the regeneration treatment of said particulate filter to burn off trapped particulates.

4. An exhaust purification system of an internal combustion engine according to claim 1, wherein said second fuel supplying device supplies said second amount of additional fuel to a remaining amount of fuel supplied by said first fuel supplying device that was not burned in said NOx storing/reducing catalyst device.

* * * * *